(12) United States Patent
Chen

(10) Patent No.: US 11,960,895 B2
(45) Date of Patent: Apr. 16, 2024

(54) METHOD AND CONTROL DEVICE FOR RETURNING OF COMMAND RESPONSE INFORMATION, AND ELECTRONIC DEVICE

(71) Applicants: Haining ESWIN IC Design Co., Ltd., Jiaxing (CN); Beijing ESWIN Computing Technology Co., Ltd., Beijing (CN)

(72) Inventor: Zhe Chen, Jiaxing (CN)

(73) Assignees: Haining ESWIN IC Design Co., Ltd., Jiaxing (CN); Beijing ESWIN Computing Technology Co., Ltd., Beijing (CN)

( * ) Notice: Subject to any disclaimer, the term of this patent is extended or adjusted under 35 U.S.C. 154(b) by 364 days.

(21) Appl. No.: 17/603,929

(22) PCT Filed: May 14, 2021

(86) PCT No.: PCT/CN2021/093848
§ 371 (c)(1),
(2) Date: Oct. 14, 2021

(87) PCT Pub. No.: WO2022/110681
PCT Pub. Date: Jun. 2, 2022

(65) Prior Publication Data
US 2023/0138057 A1 May 4, 2023

(30) Foreign Application Priority Data
Nov. 24, 2020 (CN) .......................... 202011332652.7

(51) Int. Cl.
*G06F 12/0831* (2016.01)
*G06F 9/38* (2018.01)
*G06F 9/54* (2006.01)

(52) U.S. Cl.
CPC ............ *G06F 9/3856* (2023.08); *G06F 9/546* (2013.01); *G06F 2209/548* (2013.01)

(58) Field of Classification Search
None
See application file for complete search history.

(56) References Cited

U.S. PATENT DOCUMENTS

| | | | |
|---|---|---|---|
| 6,112,265 A | 8/2000 | Harriman et al. | |
| 6,681,241 B1 * | 1/2004 | Fagen | G06F 9/52 718/100 |

(Continued)

FOREIGN PATENT DOCUMENTS

| | | |
|---|---|---|
| CN | 1348564 A | 5/2002 |
| CN | 103366801 A | 10/2013 |

(Continued)

OTHER PUBLICATIONS

Written Opinion of the International Search Authority corresponding to International Application No. PCT/CN2021/093848, dated Aug. 23, 2021. (9 pages).

(Continued)

*Primary Examiner* — Hyun Nam
(74) *Attorney, Agent, or Firm* — Maginot, Moore & Beck LLP

(57) ABSTRACT

A method and a control device for returning of command response information, and an electronic device are provided. The method includes: receiving response information for a command request, the response information carrying a status identification and a level identification of the command request; storing the response information in a corresponding level of a data queue in accordance with the level identification, where the data queue includes multiple levels, and each level of the data queue is used to store one or more pieces of response information; scanning all levels of the data queue, and determining, a level in which all parts of (Continued)

response information are collected, as a candidate level; determining a first piece of response information in accordance with a status identification of the response information stored in the candidate level; and outputting the first piece of response information.

20 Claims, 8 Drawing Sheets

(56) References Cited

U.S. PATENT DOCUMENTS

| | | | |
|---|---|---|---|
| 9,996,484 B1* | 6/2018 | Davis | G06F 13/105 |
| 11,010,322 B1* | 5/2021 | Morshed | G06F 13/4022 |
| 2003/0126271 A1* | 7/2003 | Mowry | H04L 69/326 |
| | | | 370/310 |
| 2009/0193201 A1 | 7/2009 | Brittain et al. | |
| 2009/0307473 A1* | 12/2009 | Miller | G06F 9/3824 |
| | | | 712/245 |
| 2011/0191543 A1* | 8/2011 | Craske | G06F 12/0831 |
| | | | 711/146 |
| 2013/0151741 A1 | 6/2013 | Walker | |
| 2013/0212330 A1 | 8/2013 | Brittain et al. | |
| 2013/0262761 A1 | 10/2013 | Oh | |
| 2014/0115273 A1* | 4/2014 | Chirca | G06F 12/0284 |
| | | | 711/146 |
| 2015/0006869 A1* | 1/2015 | Ehrlich | G06F 9/30061 |
| | | | 712/244 |
| 2015/0341189 A1* | 11/2015 | Zhang | H04L 61/5014 |
| | | | 370/338 |
| 2016/0062930 A1 | 3/2016 | Kijima et al. | |
| 2017/0357512 A1* | 12/2017 | Landers | G06F 9/3836 |
| 2018/0113648 A1 | 4/2018 | Brandl et al. | |
| 2019/0188164 A1* | 6/2019 | Avrukin | G06F 13/1673 |
| 2020/0379909 A1* | 12/2020 | Uhrenholt | G06F 12/0831 |
| 2021/0014177 A1* | 1/2021 | Kasichainula | H04L 47/6295 |
| 2022/0066971 A1* | 3/2022 | Brewer | G06F 13/1668 |
| 2022/0377594 A1* | 11/2022 | Henriques De Jesus | |
| | | | H04W 28/0236 |
| 2023/0201649 A1* | 6/2023 | Ayala | A63B 21/0052 |
| | | | 482/110 |
| 2023/0384610 A1* | 11/2023 | Huang | G02B 27/4272 |
| 2023/0386290 A1* | 11/2023 | Davis | G07F 17/3216 |

FOREIGN PATENT DOCUMENTS

| | | |
|---|---|---|
| CN | 103399832 A | 11/2013 |
| CN | 103999159 A | 8/2014 |
| CN | 105190583 A | 12/2015 |
| CN | 109863481 A | 6/2019 |
| CN | 111597057 A | 8/2020 |
| CN | 112395011 A | 2/2021 |

OTHER PUBLICATIONS

Machine Translation of CN103399832A. (10 Pages).
Machine Translation of CN111597057A. (31 Pages).
Machine Translation of CN112395011A. (33 Pages).
Machine Translation of Written Opinion of the International Search Authority corresponding to International Application No. PCT/CN2021/093848, dated Aug. 23, 2021. (2 pages).
Chinese Office Action corresponding to Chinese Patent Application No. 202011332652.7, dated May 20, 2022 (10 Pages).
English Translation of Chinese Office Action corresponding to Chinese Patent Application No. 202011332652.7, dated May 20, 2022 (10 Pages).
Probell, J. "Playing well with others: How NoC compositions enable global team design." (2014).
English Machine Translation of CN1348564A. (40 Pages).

* cited by examiner

METHOD AND CONTROL DEVICE FOR RETURNING OF COMMAND RESPONSE INFORMATION, AND ELECTRONIC DEVICE

CROSS-REFERENCE TO RELATED APPLICATION

This application is a U.S. national phase of PCT Application No. PCT/CN2021/093848 filed on May 14, 2021, which claims a priority to Chinese Patent Application No. 202011332652.7 filed on Nov. 24, 2020, the disclosures of which are incorporated in their entireties by reference herein.

TECHNICAL FIELD

The present disclosure relates to the field of integrated circuit design, in particular to a method for returning of command response information, a control device for returning of command response information, and an electronic device.

BACKGROUND

Currently, scale of a system on chip (System on Chip, SoC) is getting larger and larger, the requirement on bandwidth is increased exponentially, the number of double data rate (Double Data Rate, DDR) channels required is also increasing, and bus interconnection between chips is becoming more and more complicated. Command responses are out-of-order in a multi-channel DDR system. That is, a transmission command from a primary device may be divided into multiple sub-commands and sent to different DDR channels. Since the DDR channels are processed in a random order, responses for the multiple sub-commands are returned in an out-of-order manner. In an advanced extensible interface (Advanced Extensible Interface, AXI) protocol, it is required that for commands of a same type and having a same identity document (Identity Document, ID), their responses need to be returned in a sequence in which these commands are sent. Therefore, a reordering control device is required in the primary device side to address the above issues.

At present, a mainstream interconnection bus that supports reordering is Arteris Network-on-Chip (NoC). A reordering unit is arranged in an initiator agent, and a depth and a bit width of the reordering unit may be configured, which is relatively flexible. However, there exist such defects as large area, high power consumption and large latency, and it is not suitable for the design of most interconnection buses.

Currently, there are not many templates and specifications for the reordering control device in interconnection buses. Issues to be addressed may include: 1) reordering efficiency, 2) an area of the reordering control device, and 3) a power consumption of the reordering control device.

SUMMARY

A method for returning of command response information, a control device for returning of command response information and an electronic device are provided in the present disclosure, so as to address the issues in the related technologies.

In a first aspect, a method for returning of command response information is provided, including: receiving response information for a command request, where the response information carries a status identification and a level identification of the command request; storing the response information in a corresponding level of a data queue in accordance with the level identification, where the data queue includes multiple levels, and each of the multiple levels of the data queue is used to store one or more pieces of response information; scanning all levels of the data queue, and determining, a level in which all parts of response information are collected, as a candidate level; determining a first piece of response information in accordance with a status identification of the response information stored in the candidate level; and outputting the first piece of response information.

Optionally, the scanning all levels of the data queue and determining the level in which all part of response information are collected as the candidate level includes: determining whether a data status flag bit about response information currently stored in each level of the data queue meets a preset condition; and in a case that the data status flag bit meets the preset condition, determining the level as the candidate level.

Optionally, prior to the receiving the response information for the command request, the method further includes: receiving the command request; storing the command request in a command queue, where the command queue includes multiple levels; and storing the status identification and the level identification of the command request stored in the command queue.

Optionally, the status identification includes a timing identification of the command request stored in the command queue; and the determining the first piece of response information in accordance with the status identification of the response information stored in the candidate level includes: determining a candidate command request stored in a corresponding level of the command queue, in accordance with the level identification of the response information stored in the candidate level; determining a first command request from the candidate command request in accordance with a timing identification of the candidate command request, where a level identification of the first command request is a target level identification; and determining, in accordance with the target level identification, target response information stored in a target level of the data queue, as the first piece of response information.

Optionally, multiple command requests of a same type have a same identity, the status identification further includes an identity of the command request;

the status identification further includes an identity of the command request stored in the command queue; and subsequent to the storing the status identification and the level identification of the command request stored in the command queue, the method further includes: storing the identity, the level identification and the timing identification of the command request stored in the command queue; recording whether there is a command request stored in the level of the command queue; recording a first sequence identification of the command request, where the first sequence identification stores a sequence in which command requests having a same identity as the command request are stored in the command queue; scanning all levels of the command queue, and determining whether another command request having the same identity as the command request has been stored, where in the case that the another command request having the same identity has not been stored, the command request is recorded as a valid command request, and in the case that the another command request having the same identity has been stored, the command request is recorded as an invalid command request; and storing the identity and the first sequence identification of the command request stored in the command queue;

the determining the first command request from the candidate command request in accordance with the timing identification of the candidate command request includes: selecting a candidate level in which a valid command request is stored; and determining the first command request from the candidate level of the command queue in which the valid command request is stored, in accordance with the timing identification of the candidate command request.

Optionally, subsequent to the outputting the first piece of response information, the method further includes: releasing the target level of the command queue; and updating timing identifications of all levels of the command queue.

Optionally, each command request corresponds to one piece of response information, each piece of response information includes multiple pieces of response sub-information, each piece of response sub-information carries a second sequence identification, and a return sequence of the piece of response sub-information in the response information is stored in the second sequence identification; and the outputting the first piece of response information includes: outputting the multiple pieces of response sub-information of the first piece of response information sequentially in accordance with the second sequence identification carried in each piece of response sub-information of the first piece of response information.

In a second aspect, a control device for returning of command response information is provided, including: a first receiving module, configured to receive response information for a command request, where the response information carries a status identification and a level identification of the command request; a first storage module, configured to store the response information in a corresponding level of a data queue in accordance with the level identification, where the data queue includes multiple levels, and each of the multiple levels of the data queue is used to store one or more pieces of response information; a first selection module, configured to scan all levels of the data queue, and determine, a level in which all parts of response information are collected, as a candidate level; a second selection module, configured to determine a first piece of response information in accordance with a status identification of the response information stored in the candidate level; and an outputting module, configured to output the first piece of response information.

Optionally, the first selection module is further configured to determine whether a data status flag bit about response information currently stored in each level of the data queue meets a preset condition; and in a case that the data status flag bit meets the preset condition, determine the level as the candidate level.

Optionally, the control device for returning of command response information further includes: a second receiving module, configured to receive the command request; and a second storage module, configured to store the command request in a command queue, where the command queue includes multiple levels; and store the status identification and the level identification of the command request stored in the command queue.

Optionally, the status identification includes a timing identification of the command request stored in the command queue;

the second selection module is further configured to determine a first command request from the candidate command request in accordance with a timing identification of the candidate command request, where a level identification of the first command request is a target level identification; and determine, in accordance with the target level identification, target response information stored in a target level of the data queue as the first piece of response information.

Optionally, multiple command requests of a same type have a same identity;

the status identification further includes an identity of the command request stored in the command queue;

the second storage module is configured to record whether there is a command request stored in the level of the command queue; record a first sequence identification of the command request, where the first sequence identification stores a sequence in which command requests having a same identity as the command request are stored in the command queue; scan all levels of the command queue, and determine whether another command request having the same identity as the command request has been stored, where in the case that the another command request having the same identity has not been stored, the command request is recorded as a valid command request, and in the case that the another command request having the same identity has been stored, the command request is recorded as an invalid command request; and store the identity and the first sequence identification of the command request stored in the command queue;

the first selection module is further configured to select a candidate level in which a valid command request is stored; and the second selection module is further configured to determine the first command request from the candidate level of the command queue in which the valid command request is stored, in accordance with the timing identification of the candidate command request.

Optionally, the control device for returning of command response information further includes an updating module configured to release the target level of the command queue after outputting the first piece of response information, and update timing identifications of all levels of the command queue.

Optionally, each command request corresponds to one piece of response information, each command request corresponds to one piece of response information, each piece of response information includes multiple pieces of response sub-information, each piece of response sub-information carries a second sequence identification, and a return sequence of the piece of response sub-information in the response information is stored in the second sequence identification; and the outputting module is further configured to output the multiple pieces of response sub-information of the first piece of response information sequentially in accordance with the second sequence identification carried in each piece of response sub-information of the first piece of response information.

In a third aspect, an electronic device is provided, including: a processor, a memory and a program or an instruction stored in the memory and executable by the processor, and the program or the instruction, when being executed by the processor, performs the steps of the method for returning of command response information according to the first aspect.

In a fourth aspect, a readable storage medium on which a program or an instruction is stored is provided. The program or the instruction, when being executed by a processor, performs the steps of the method for returning of command response information according to the first aspect.

In the present disclosure, the response information is stored in the corresponding level of the data queue in accordance with the level identification in the status identification of the corresponding command request carried by the response information, the level in which all the parts of response information are collected is determined as the candidate level, the first piece of response information is selected from the candidate level in accordance with the status identification and is outputted. The method for returning of command response information is easy to be implemented, the corresponding logic circuit is relatively small and the circuit frequency is high, which may be embedded in an interconnection bus to support a multi-channel double data rate (DDR) system and has such characteristics as high performance, low latency, and low power consumption. As a result, the product competitiveness of the interconnection bus is improved.

BRIEF DESCRIPTION OF THE DRAWINGS

Through reading detailed descriptions of some embodiments in the following, various other advantages and benefits will become clear to those of ordinary skill in the art. The drawings are only used for the purpose of illustrating some embodiments, and are not considered as a limitation to the present disclosure. Moreover, in the drawings, the same reference symbols are used to denote the same components. In the drawings.

DETAILED DESCRIPTION

The technical solutions in embodiments of the present disclosure are described clearly and completely in conjunction with drawings in the embodiments of the present disclosure. Apparently, the described embodiments are merely a part of rather than all the embodiments of the present disclosure. All other embodiments obtained by a person ordinary skilled in the art based on the embodiments of the present disclosure without any creative efforts fall within the protection scope of the present disclosure.

Figure 1:
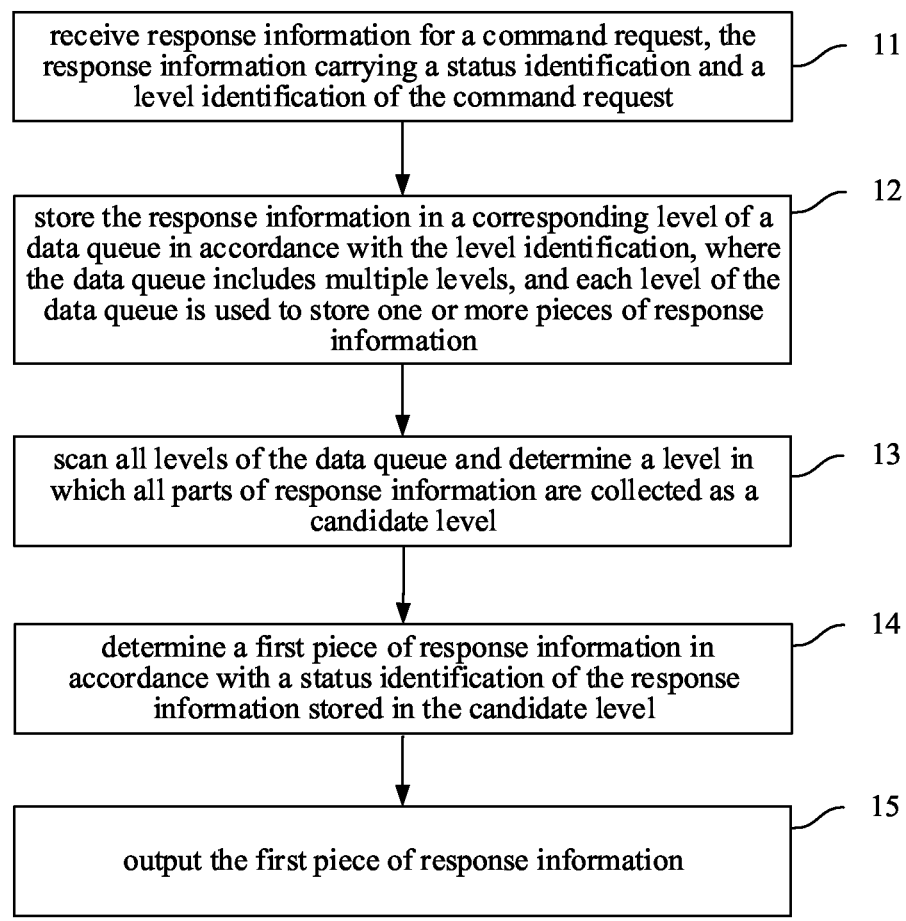
FIG. 1 is a flow chart illustrating a method for returning of command response information according to a first embodiment of the present disclosure.

Reference is made to FIG. 1, which is a flow chart illustrating a method for returning of command response information according to a first embodiment of the present disclosure. The method includes the following steps.

Step 11 includes: receiving response information for a command request, where the response information carries a status identification and a level identification of the command request.

Step 12 includes: storing the response information in a corresponding level of a data queue in accordance with the level identification, where the data queue includes multiple levels, and each of the multiple levels of the data queue is used to store one or more pieces of response information.

Step 13 includes: scanning all levels of the data queue and determining, a level in which all parts of response information are collected, as a candidate level.

Step 14 includes: determining a first piece of response information in accordance with a status identification of the response information stored in the candidate level.

Step 15 includes: outputting the first piece of response information.

In the embodiments of the present disclosure, the response information is stored in the corresponding level of the data queue in accordance with the level identification in the status identification of the corresponding command request carried by the response information, the level in which all the parts of response information are collected is determined as the candidate level, the first piece of response information is selected from the candidate level in accordance with the status identification and is outputted. The method for returning of command response information is easy to be implemented, the corresponding logic circuit is relatively small, and the circuit frequency is high, which may be embedded in an interconnection bus to support a multi-channel double data rate (DDR) system and has such characteristics as high performance, low latency, and low power consumption. As a result, the product competitiveness of the interconnection bus is improved.

In some embodiments of the present disclosure, optionally, the scanning all levels of the data queue and determining the level in which all the parts of response information are collected as the candidate level includes:

determining whether a data status flag bit about response information currently stored in each level of the data queue meets a preset condition; and in a case that the data status flag bit meets the preset condition, determining the level as the candidate level.

In some embodiments of the present disclosure, optionally, in the case that the data status flag bit about the response information in a level of the data queue is 1, it indicates that all parts of the response information in this level of the data queue are collected.

In the embodiments of the present disclosure, the data queue is mainly used to store response information fed back from a secondary device, and the response information includes status information and data information of the response. The data queue has a multi-level structure, and each level corresponds to a maximum data length of one piece of response information. Therefore, one piece of response information may be written into the data queue after multiple times. That is, each piece of response information may include multiple pieces of response sub-information. When all pieces of data corresponding to an entire piece of response information have been collected, they are returned to a primary device together for further processing.

In some embodiments of the present disclosure, optionally, DVLD is used to define whether all parts of response information stored in a level of the data queue are collected. In the case that all parts of response information stored in the level of the data queue are collected, a confirmation signal indicating that all parts of the response information are collected is labelled, that is, DVLD of the level of the data queue is pulled up, and it is recorded that DVLD=1. In the case that not all the parts of response information stored in the level of the data queue are collected, it is recorded that DVLD=0 for the level of the data queue.

In the embodiments of the present disclosure, whether all parts of response information are collected is determined based on the data status flag bit about the response information, which is quick and easy to be implemented.

In some embodiments of the present disclosure, optionally, prior to the receiving the response information for the command request, the method further includes:
receiving the command request;
storing the command request in a command queue, where the command queue includes multiple levels; and
storing the status identification and the level identification of the command request stored in the command queue.

Specifically, in an Advanced Microcontroller Bus Architecture (AMBA) Advanced Extensible Interface (AXI) protocol, it is required that for transmissions having a same identity (ID), their responses need to be returned sequentially, and for transmissions having different IDs, their responses may be returned in an out-of-order manner. In some embodiments of the present disclosure, one or more command requests correspond to one identity, each command request is stored in a level of the command queue, each level has a unique level ID (LID), and a unique timing identification (TID) is assigned to each level, which is used to indicate a sequence in which the command requests arrive. The TID may dynamically change with the entry and exit of the command requests. In addition, identity information of the command request may be cached in the command queue and then transmitted to the primary device when returning the response.

In the embodiments of the present disclosure, the levels of the command queue corresponds to the levels of the data queue respectively; and through a certain level of the data queue, the status identification and level identification of the command request stored in the corresponding level of the command queue may be queried.

In some embodiments of the present disclosure, optionally, the status identification includes a timing identification of the command request stored in the command queue; and
the determining the first piece of response information in accordance with the status identification of the response information stored in the candidate level includes:
determining a candidate command request stored in a corresponding level of the command queue, in accordance with the level identification of the response information stored in the candidate level;
determining a first command request from the candidate command request in accordance with a timing identification of the candidate command request, where a level identification of the first command request is a target level identification; and determining, in accordance with the target level identification, target response information stored in a target level of the data queue, as the first piece of response information In the embodiments of the present disclosure, the timing identification and the level identification of the command request stored in the command queue are recorded, the first command request is determined from the candidate command request in accordance with the timing identification, and a corresponding level of the data queue in which the target response information is stored is determined in accordance with the target level identification of the first command request. The target response information is the first piece of response information to be outputted.

Figure 2:
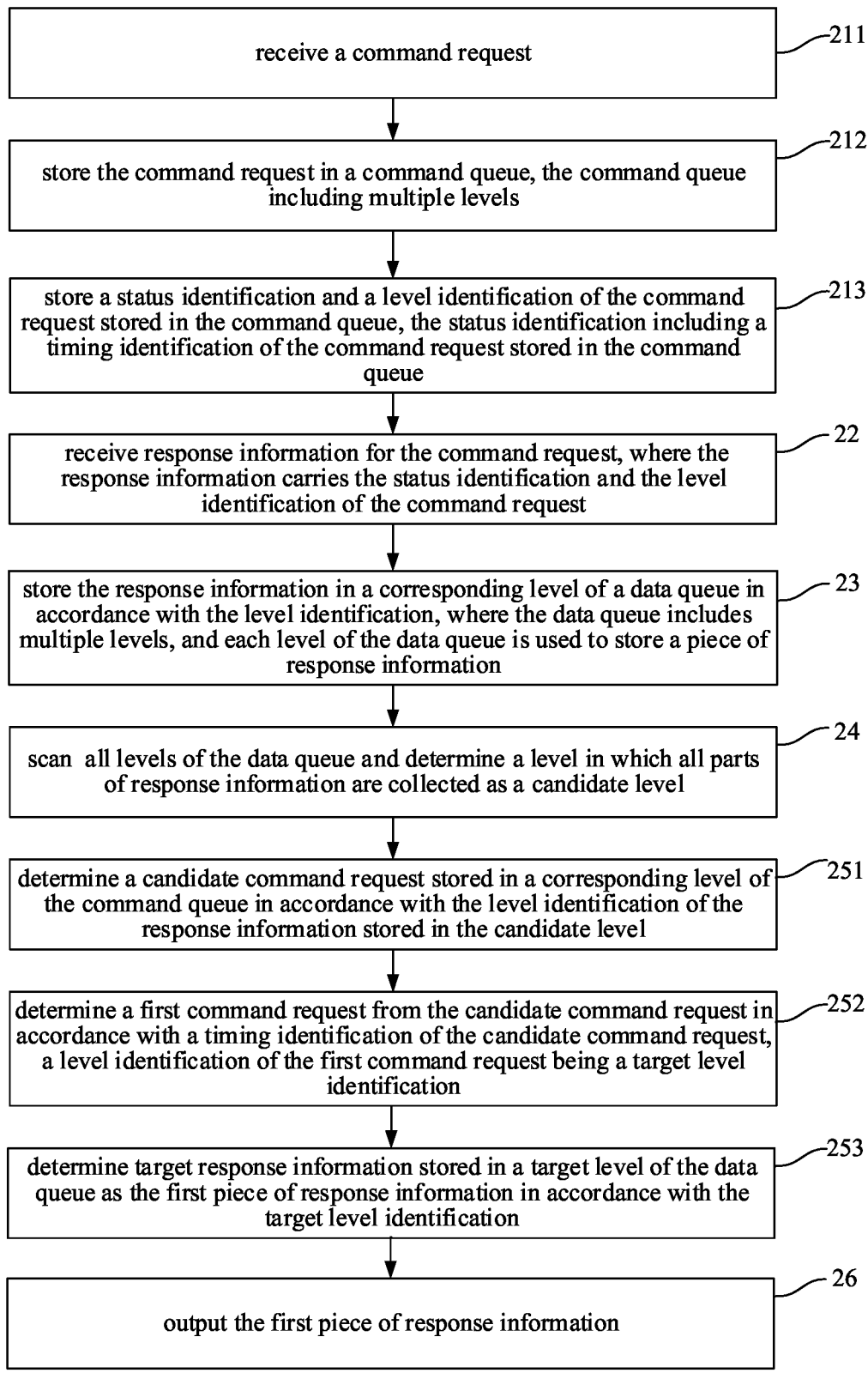
FIG. 2 is a flow chart illustrating a control method for returning of command response information according to a second embodiment of the present disclosure.

Reference is made to FIG. 2, which is a flow chart illustrating a control method for returning of command response information according to a second embodiment of the present disclosure. The method includes the following steps.

Step 211 includes: receiving a command request.

Step 212 includes: storing the command request in a command queue, where the command queue includes multiple levels.

Step 213 includes: storing a status identification and a level identification of the command request stored in the command queue, where the status identification includes a timing identification of the command request stored in the command queue.

Step 22 includes: receiving response information for the command request, where the response information carries the status identification and the level identification of the command request.

Step 23 includes: storing the response information in a corresponding level of a data queue in accordance with the level identification, where the data queue includes multiple levels, and each of the multiple levels of the data queue is used to store a piece of response information.

Step 24 includes: scanning all levels of the data queue, and determining, a level in which all parts of response information are collected, as a candidate level.

Step 251 includes: determining a candidate command request stored in a corresponding level of the command queue, in accordance with the level identification of the response information stored in the candidate level.

Step 252 includes: determining a first command request from the candidate command request in accordance with a timing identification of the candidate command request, where a level identification of the first command request is a target level identification.

Step 253 includes: determining, in accordance with the target level identification, target response information stored in a target level of the data queue, as the first piece of response information.

Step 26 includes: outputting the first piece of response information.

Figure 3:
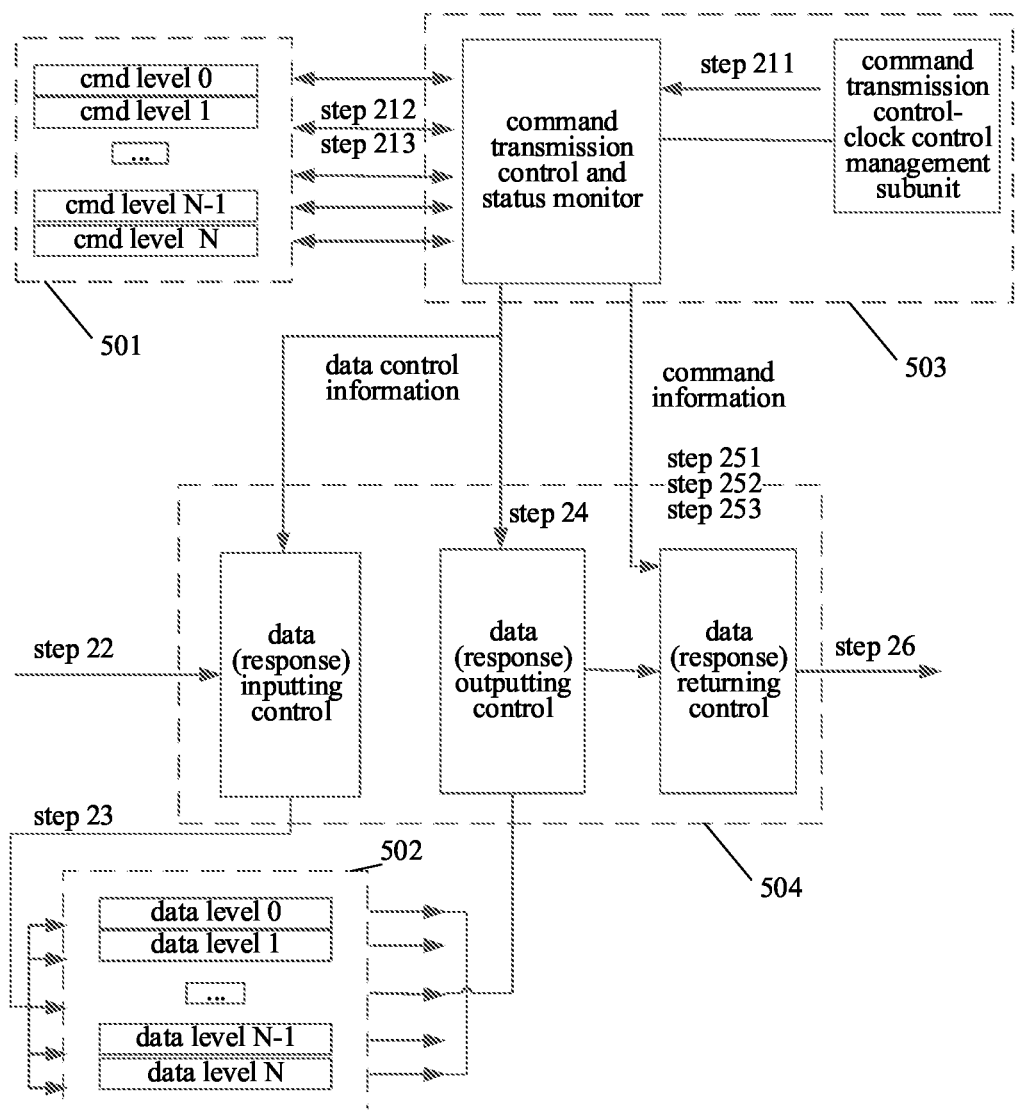
FIG. 3 is a flow chart illustrating a control method for returning of command response information according to a third embodiment of the present disclosure.

Reference is made to FIG. 3, which is a flow chart illustrating a control method for returning of command response information according to a third embodiment of the present disclosure. The method may be applied to a control device for returning of command response information, so as to implement each step of the control method for returning of command response information according to the second embodiment of the present disclosure. The control device for returning of command response information includes a command queue unit 501, a data queue unit 502, a command transmission control unit 503 and a data response control unit 504.

In some embodiments of the present disclosure, optionally, multiple command requests of a same type have a same identity;

the status identification further includes an identity of the command request stored in the command queue;

subsequent to the storing the status identification and the level identification of the command request stored in the command queue, the method further includes:

recording whether there is a command request stored in the level of the command queue;

recording a first sequence identification of the command request, where the first sequence identification stores a sequence in which command requests having a same identity as the command request are stored in the command queue;

scanning all levels of the command queue, and determining whether another command request having the same identity as the command request has been stored, where in the case that the another command request having the same identity has not been stored, the command request is recorded as a valid command request, and in the case that the another command request having the same identity has been stored, the command request is recorded as an invalid command request; and storing the identity and the first sequence identification of the command request stored in the command queue;

the determining the first command request from the candidate command request in accordance with the timing identification of the candidate command request includes:

selecting a candidate level in which a valid command request is stored; and determining the first command request from the candidate level of the command queue in which the valid command request is stored, in accordance with the timing identification of the candidate command request.

In the embodiments of the present disclosure, for multiple command requests having the same identity, when a command request is stored in a corresponding level of the command queue, whether a command has been stored in this level of the command queue and a sequence in which the multiple command requests having the identity are stored are recorded; and in the case that the command request ranks first in the command queue among the multiple command requests having the same identity, it meets the determination condition for the candidate command request for the first command request, which may be used for control of output of pieces of response information corresponding to the multiple command requests having the same identity, being quick and easy to be implemented.

In some embodiments of the present disclosure, optionally, CVLD may be used to indicate whether a command is stored in a level of the command queue, and TVLD may be used to indicate whether a command stored in a level of the command queue ranks first in the command queue among the multiple command requests having the same identity.

Figure 4:
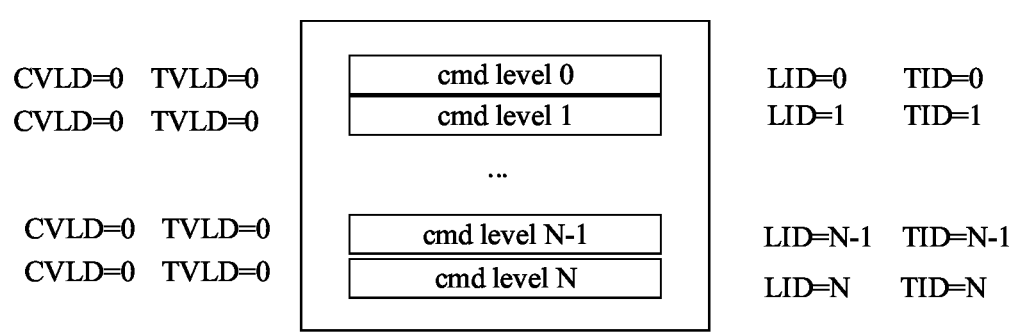
FIG. 4 is a schematic structural diagram of levels of a command queue according to a fourth embodiment of the present disclosure.

To be specific, reference is made to FIG. 4, which is a schematic structural diagram of levels of a command queue according to a fourth embodiment of the present disclosure.

Each level of the command queue has only three operation states in actual operation. (1) no command is stored, i.e., CVLD=0, TVLD=0. (2) a command is stored, and the command does not ranks first in the command queue among the multiple command requests having the same identity, i.e., CVLD=1, TVLD=0; and in this case, the command is not the first command in the command queue among the multiple command requests having the same identity, and its response may not be returned first. (3) a command is stored, and the command ranks first in the command queue among the multiple command requests having the same identity, i.e., CVLD=1, TVLD=1; it means that in this case, the command is the first command in the command queue among the multiple command requests having the same identity, and its response may be returned immediately.

In some embodiments of the present disclosure, optionally, such parameters as LID, TID, CVLD and TVLD are stored in each level of the command queue according to the command request, the first command request is determined from the candidate command request easily and quickly.

Figure 5:
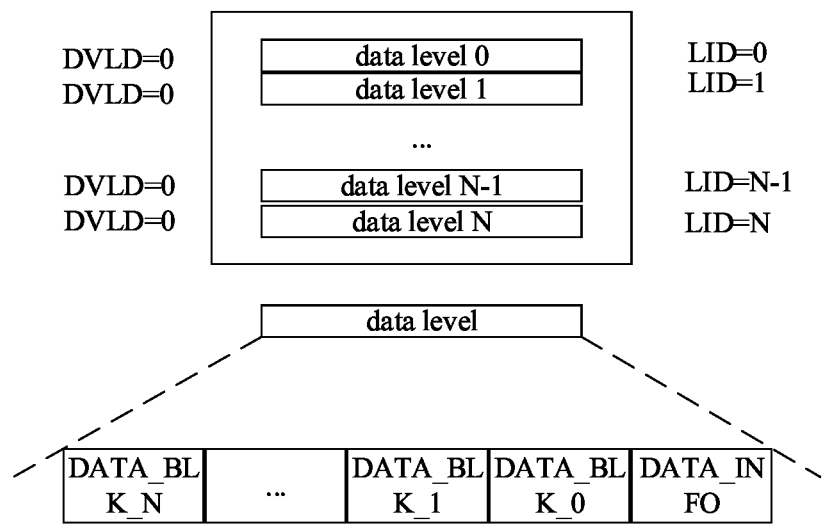
FIG. 5 is a schematic structural diagram of levels of a data queue according to a fifth embodiment of the present disclosure.

Reference is made to FIG. 5, which is a schematic structural diagram of levels of a data queue according to a fifth embodiment of the present disclosure. The levels of the data queue corresponds to the levels of the command queue respectively, and response information stored in each level of the data queue includes such parameters as LID, TID and DVLD of the corresponding level of the command queue.

In some embodiments of the present disclosure, optionally, subsequent to the outputting the first piece of response information, the method further includes:

releasing the target level of the command queue; and updating timing identifications of all levels of the command queue.

In the embodiments of the present disclosure, the timing identifications may be updated in a unified manner after responding to the command, which may effectively reduce the deep dependence on the physical cache unit and increase the utilization ratio of each level of the command queue.

In some embodiments of the present disclosure, optionally, the output control of pieces of response information of the data queue is determined by the status of the data queue and the status of the command queue.

Figure 6:
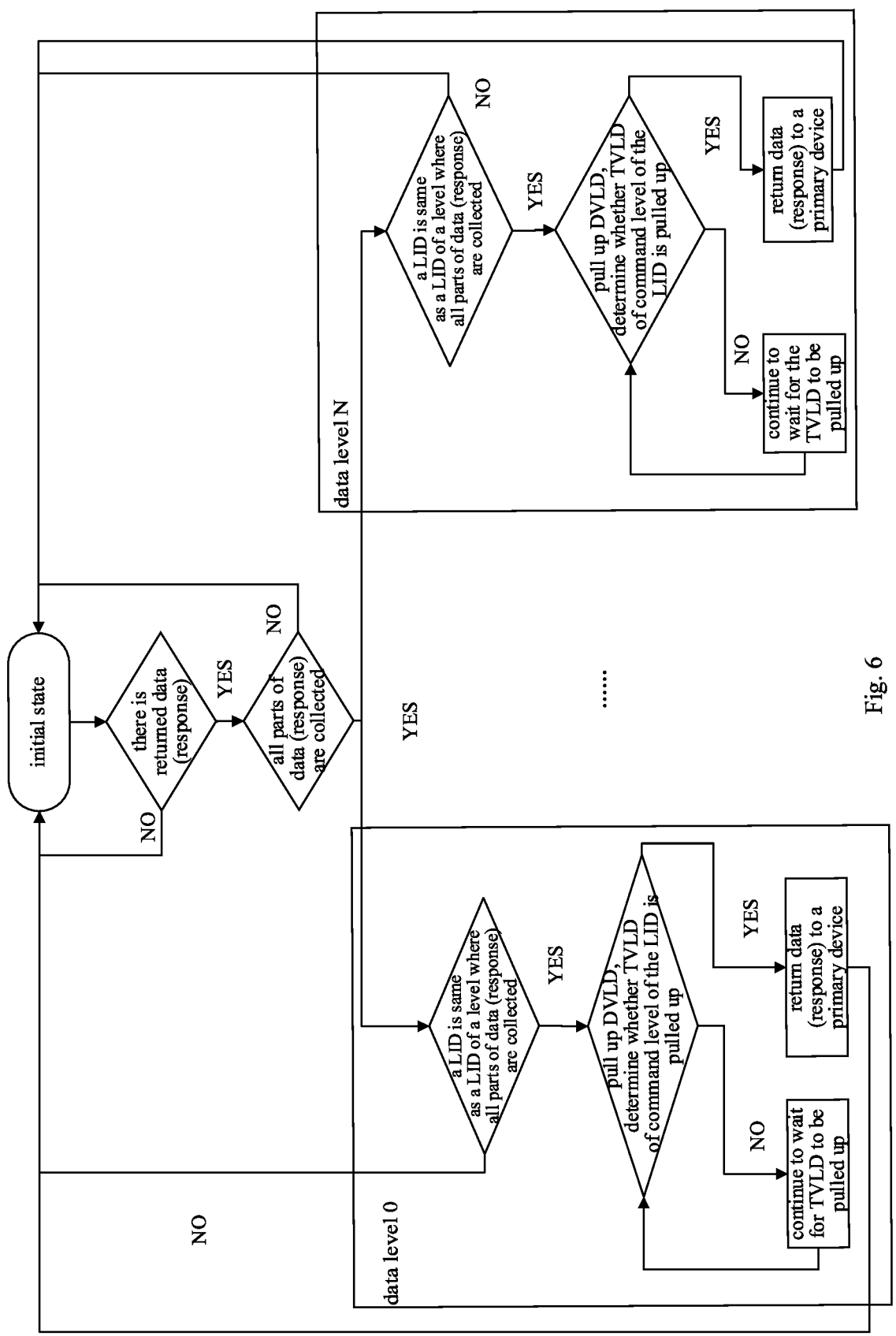
FIG. 6 is a flow chart illustrating a output control method of response information of a data queue according to a sixth embodiment of the present disclosure.

Specifically, reference is made to FIG. 6, which is a flow chart illustrating an output control method of response information of a data queue according to a sixth embodiment of the present disclosure. In the case that there is returned data and all parts of response information in the level of the data queue are collected, it is determined for each level of the data queue whether its level is the same as the level of the data queue in which all the parts of response information are collected. In the case that they are the same, a DVLD of the corresponding level of the data queue is pulled up, and a candidate level in which all parts of response information are collected is acquired. Then, it is determined whether a TVLD of the level of the command queue corresponding to each candidate level of the data queue is pulled up. In the case that the TVLD is pulled up, the response information is returned to the primary device. Otherwise, it continues to wait for the TVLD of the level of the command queue to be pulled up.

In the embodiments of the present disclosure, the entry and exit of the command queue is controlled by using a concept based a linked list index, and a response to a corresponding command is returned to the primary device by selecting an appropriate time according to a situation of the data queue, so as to avoid the appearance of bubbles in a data bus, and improve the utilization ratio of the interconnection bus. A special ID recovery mechanism is adopted to reduce the deep dependence on the command queue, thereby reducing an area of the control device for returning of command response information.

Figure 7:
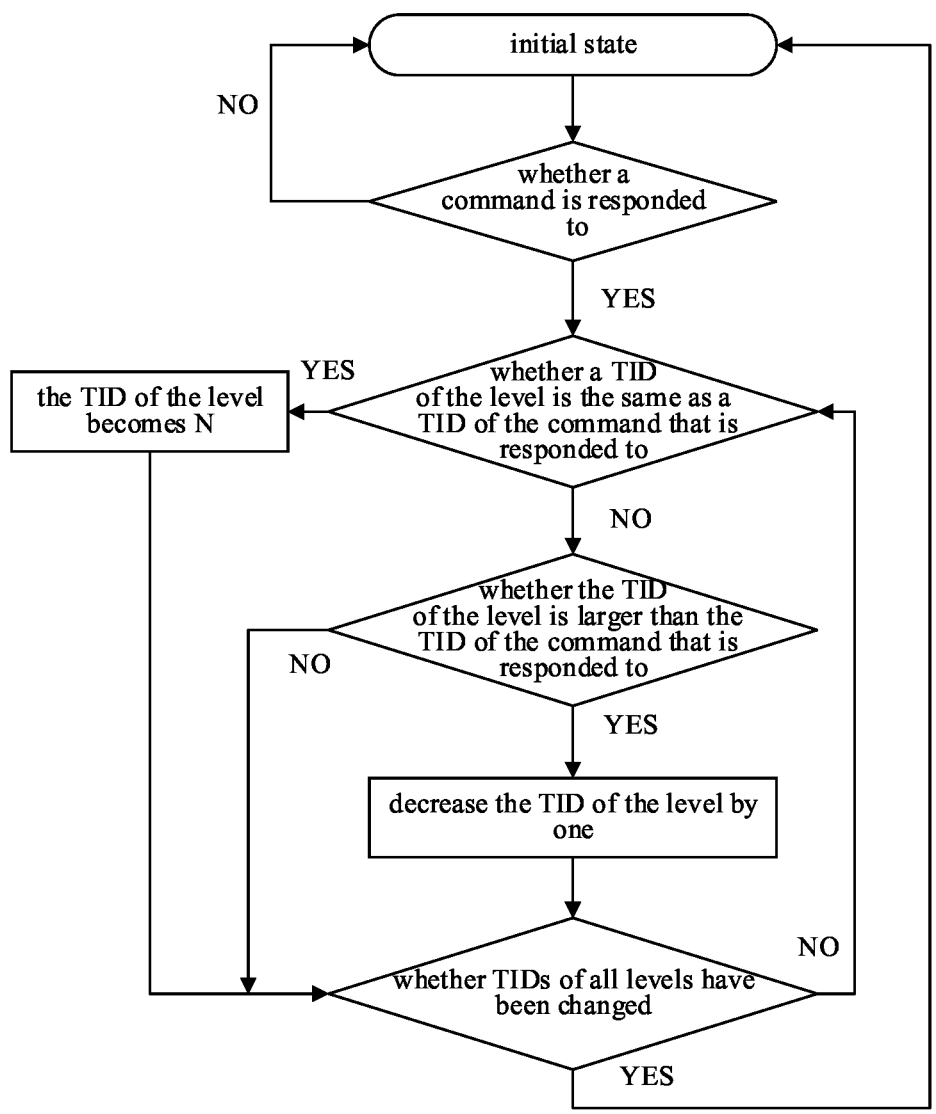
FIG. 7 is a flow chart illustrating management mechanism of level release of a command queue according to a seventh embodiment of the present disclosure.

Specifically, reference is made to FIG. 7, which is a flow chart illustrating management mechanism of level release of a command queue according to a seventh embodiment of the present disclosure.

In some embodiments of the present disclosure, optionally, a dynamic management mechanism of command queue level release may be adopted for the command queue. When a command is responded to, a TID (timing identification) of the command that is currently responded to may be monitored, and TIDs of all levels of the command queue may be updated. When another TID of the command queue is larger than the TID of the command that is responded to, a TID of a command level corresponding to the another TID is decreased by one, the TID of the command that is currently responded to becomes the largest, and TIDs of the command queue that are smaller than the TID of the command that is responded to remain unchanged.

In some embodiments of the present disclosure, optionally, each command request corresponds to one piece of response information, each piece of response information includes multiple pieces of response sub-information, each piece of response sub-information carries a second sequence identification, and a return sequence of the piece of response sub-information in the response information is stored in the second sequence identification; and the outputting the first piece of response information includes: outputting the multiple pieces of response sub-information of the first piece of response information sequentially in accordance with the second sequence identification carried in each piece of response sub-information of the first piece of response information.

In the embodiments of the present disclosure, each command request corresponds to one piece of response information, each piece of response information includes multiple pieces of response sub-information, each piece of response sub-information carries the second sequence identification, the return sequence of the piece of response sub-information in the response information is recorded by the second sequence identification and transferred to the piece of response sub-information. When outputting the first piece of response information, sequential outputting is performed in accordance with the second sequence identification carried in each piece of response sub-information of the first piece of response information.

In the embodiments of the present disclosure, the method for returning of command response information is applicable to a return scenario where each piece of response information includes multiple pieces of response sub-information, which has strong expansibility and is easy to be implemented.

Figure 8:
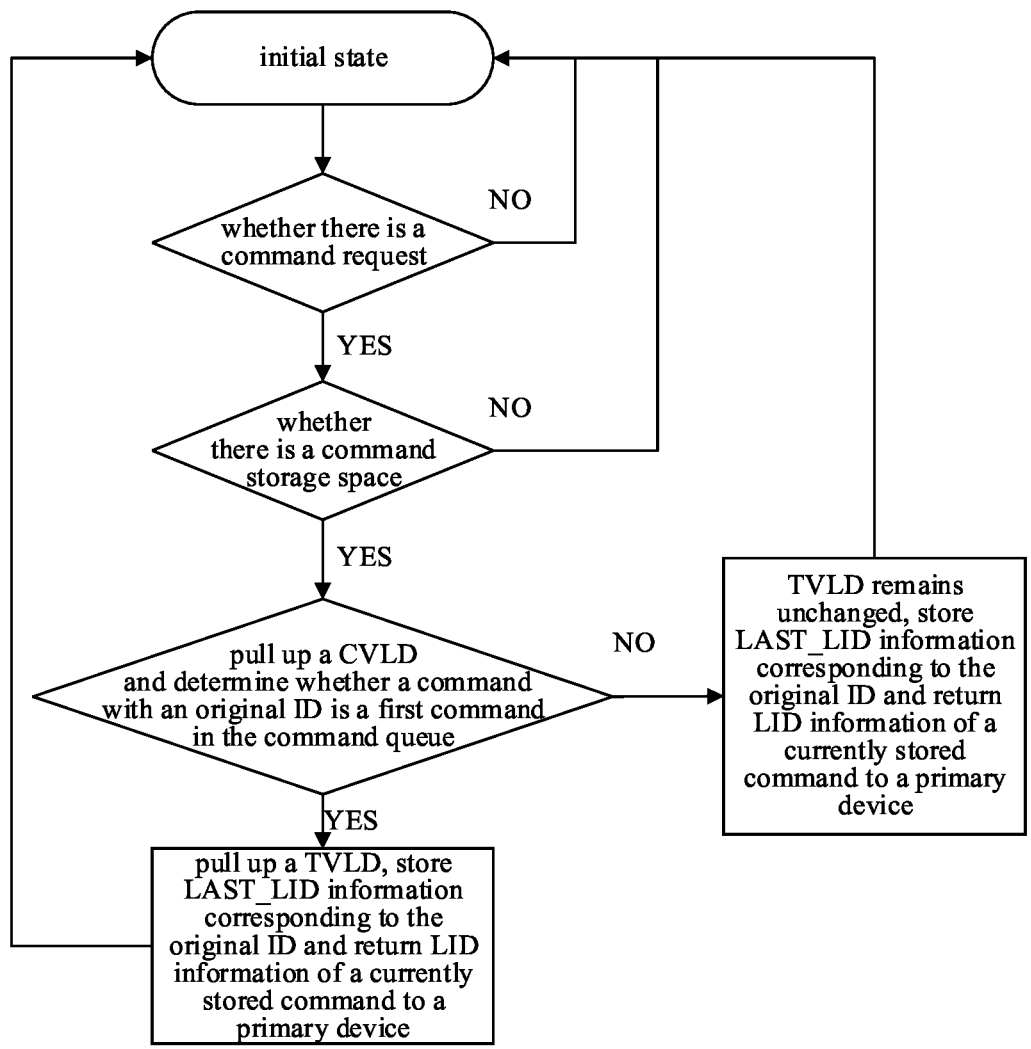
FIG. 8 is a flow chart illustrating a method for responding to commands having a same identity in a command queue sequentially according to an eighth embodiment of the present disclosure.

Specifically, reference is made to FIG. 8, which is a flow chart illustrating a method for responding to commands having a same identity in the command queue sequentially according to an eighth embodiment of the present disclosure.

In some embodiments of the present disclosure, optionally, in order to accurately prioritize commands having a same identity in the command queue, when each of the commands is cached into the command queue, a level number of a level where the current command is stored is recorded, which is represented by LAST_LID; when another command having the same ID is cached into the command queue subsequently, a LAST_LID is also stored in a cache of the command queue of the another command having the same ID. In the case that a first command having a certain ID in the command queue has been responded to, it is determined for all commands having the certain ID in the command queue whether the LAS TLID in the cache is the same as the LID of the first command that has been currently responded to; if the LAST_LID in the cache is the same as the LID of the first command that has been currently responded to, a TVLD of the corresponding level of the command queue may be pulled up, which means that the command in the corresponding level becomes a first command having the certain ID in the command queue, and has priority to be responded to.

Figure 9:
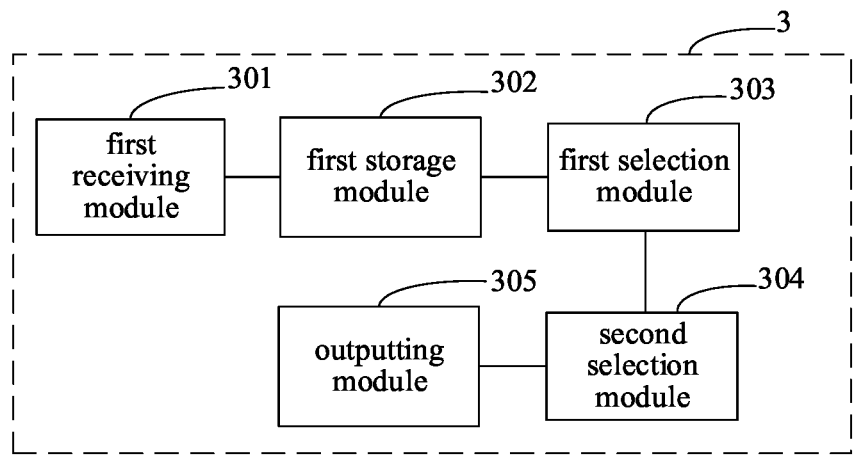
FIG. 9 is a schematic structural diagram of a control device for returning of command response information according to a ninth embodiment of the present disclosure.

Reference is made to FIG. 9, which is a schematic structural diagram of a control device 3 for returning of command response information according to a ninth embodiment of the present disclosure.

The control device 3 includes:
- a first receiving module 301, configured to receive response information for a command request, where the response information carries a status identification and a level identification of the command request;
- a first storage module 302, configured to store the response information in a corresponding level of a data queue in accordance with the level identification, where the data queue includes multiple levels, and each of the multiple levels of the data queue is used to store one or more pieces of response information;
- a first selection module 303, configured to scan all levels of the data queue, and determine, a level in which all parts of response information are collected, as a candidate level;
- a second selection module 304, configured to determine a first piece of response information in accordance with a status identification of the response information stored in the candidate level; and
- an outputting module 305, configured to output the first piece of response information.

In the embodiments of the present disclosure, in the control device for returning of command response information, the response information is stored in the corresponding level of the data queue in accordance with the level identification in the status identification of the corresponding command request carried by the response information, the level in which all the parts of response information are collected is determined as the candidate level, the first piece of response information is selected from the candidate level in accordance with the status identification and is outputted. The logic circuit of the control device for returning of command response information is relatively small, and the circuit frequency is high. It is easy to be implemented and may be embedded in an interconnection bus to support a multi-channel double data rate (DDR) system, and it has such characteristics as high performance, low latency, and low power consumption, which improves the product competitiveness of the interconnection bus.

In some embodiments of the present disclosure, optionally, the first selection module 303 is further configured to determine whether a data status flag bit about response information currently stored in each level of the data queue meets a preset condition; and in a case that the data status flag bit meets the preset condition, determine the level as the candidate level.

Figure 10:
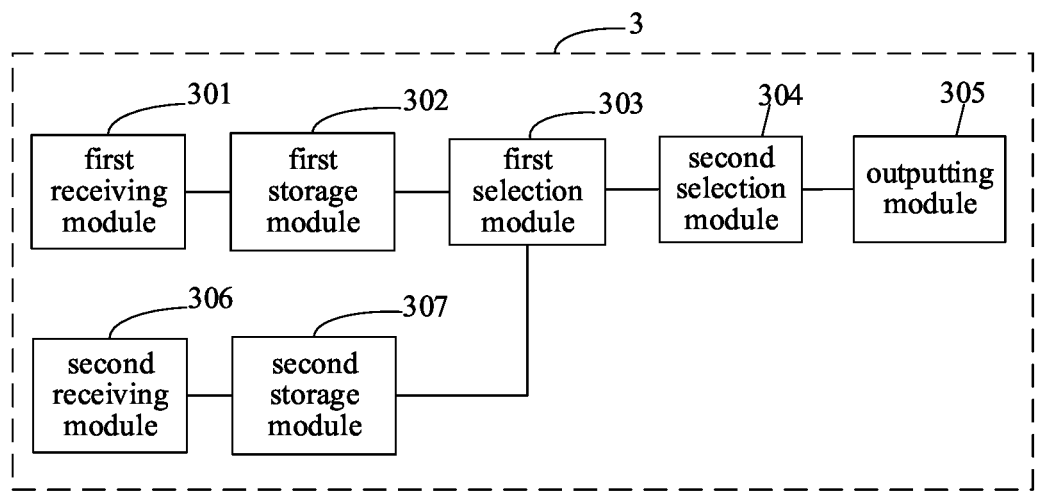
FIG. 10 is a schematic structural diagram of a control device for returning of command response information according to a tenth embodiment of the present disclosure.

Reference is made to FIG. 10, which is a schematic structural diagram of a control device 3 for returning of command response information according to a tenth embodiment of the present disclosure.

In some embodiments of the present disclosure, optionally, the control device 3 for returning of command response information further includes:
- a second receiving module 306, configured to receive the command request; and
- a second storage module 307, configured to store the command request in a command queue, where the command queue includes multiple levels; and store the status identification and the level identification of the command request stored in the command queue.

In the embodiments of the present disclosure, the levels of the command queue corresponds to the levels of the data queue respectively; and through a certain level of the data queue, the status identification and level identification of the command request stored in the corresponding level of the command queue may be queried. In some embodiments of the present disclosure, optionally, the status identification includes a timing identification of the command request stored in the command queue;

the first selection module 303 is further configured to determine a candidate command request stored in a corresponding level of the command queue, in accordance with the level identification of the response information stored in the candidate level;

the second selection module 304 is further configured to determine a first command request from the candidate command request in accordance with a timing identification of the candidate command request, where a level identification of the first command request is a target level identification; and determine, in accordance with the target level identification, target response information stored in a target level of the data queue as the first piece of response information.

In the embodiments of the present disclosure, the timing identification and the level identification of the command request stored in the command queue are recorded, the first command request is determined from the candidate command request in accordance with the timing identification, and a corresponding level of the data queue in which the target response information is stored is determined in accordance with the target level identification of the first command request. The target response information is the first piece of response information to be outputted.

In some embodiments of the present disclosure, optionally, multiple command requests of a same type have a same identity;

the status identification further includes an identity of the command request stored in the command queue;

the second storage module 307 is further configured to record whether there is a command request stored in the level of the command queue; record a first sequence identification of the command request, where the first sequence identification stores a sequence in which command requests having a same identity as the command request are stored in the command queue; scan all levels of the command queue, and determine whether another command request having the same identity as the command request has been stored, where in the case that the another command request having the same identity has not been stored, the command request is recorded as a valid command request, and in the case that the another command request having the same identity has been stored, the command request is recorded as an invalid command request; and store the identity and the first sequence identification of the command request stored in the command queue;

the first selection module 303 is further configured to select a candidate level in which a valid command request is stored; and the second selection module 304 is further configured to determine the first command request from the candidate level of the command queue in which the valid command request is stored, in accordance with the timing identification of the candidate command request.

In the embodiments of the present disclosure, for multiple command requests having the same identity, when the command request is stored in the corresponding level of the command queue, whether a command has been stored in this level of the command queue and a sequence in which the multiple command requests having the same identity are stored are recorded; and in the case that the command request ranks first in the command queue among the multiple command requests having the same identity, it meets the determination condition for the candidate command request for the first command request, which may be used for the control of output of pieces of response information corresponding to the multiple command requests having the same identity, being quick and easy to be implemented.

In some embodiments of the present disclosure, optionally, the control device for returning of command response information further includes an updating module configured to release the target level of the command queue after outputting the first piece of response information, and update timing identifications of all levels of the command queue.

In the embodiments of the present disclosure, the timing identifications may be updated in a unified manner after responding to the command, which may effectively reduce the deep dependence on the physical cache unit and increase the utilization ratio of each level of the command queue.

In some embodiments of the present disclosure, optionally, each command request corresponds to one piece of response information, each piece of response information includes multiple pieces of response sub-information, each piece of response sub-information carries a second sequence identification, and a return sequence of the piece of response sub-information in the response information is stored in the second sequence identification.

In the embodiments of the present disclosure, the method for returning of command response information is applicable to a return scenario where each piece of response information includes multiple pieces of response sub-information, which has strong expansibility and is easy to be implemented.

In some embodiments of the present disclosure, optionally, the outputting module 305 is further configured to output pieces of response sub-information of the first piece of response information sequentially in accordance with the second sequence identification carried in each piece of response sub-information of the first piece of response information.

In the embodiments of the present disclosure, each command request corresponds to one piece of response information, each piece of response information includes multiple pieces of response sub-information, each piece of response sub-information carries the second sequence identification, the return sequence of the piece of response sub-information in the response information is recorded by the second sequence identification, and transferred to the piece of response sub-information. When outputting the first piece of response information, sequential outputting is performed in accordance with the second sequence identification carried in each piece of response sub-information of the first piece of response information.

In some embodiments of the present disclosure, optionally, the control device for returning of command response information further includes a clock on-and-off control unit, configured to monitor a transmission of the entire command queue and data queue. A clock is turned on in the case that there is a command about to enter the command queue, or there is data to be inputted into the data queue, or there is a response to be outputted. In other cases, the clock remains to be in an off state, so as to save dynamic power consumption.

In some embodiments of the present disclosure, optionally, a dynamic clock management mechanism is adopted for the control device for returning of command response information, which may precisely control a master clock to be turned on and off, and reduce the dynamic power consumption as much as possible in such a manner that the clock is only turned on in the case that a transmission arrives.

Figure 11:
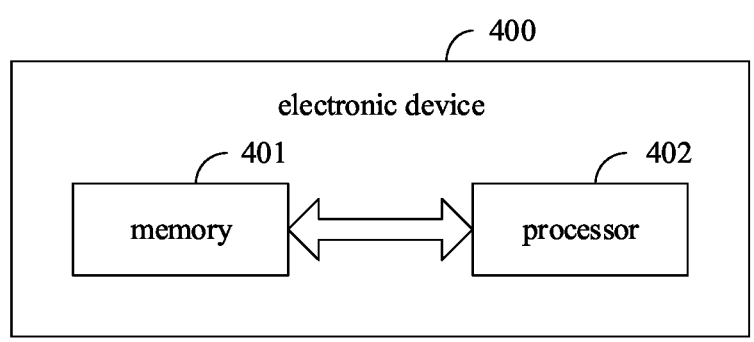
FIG. 11 is a schematic structural diagram of an electronic device according to an eleventh embodiment of the present disclosure.

Reference is made to FIG. 11, which is a schematic structural diagram of an electronic device 400 according to an eleventh embodiment of the present disclosure. The electronic device 400 includes a processor 402, a memory 401 and a program or an instruction stored in the memory 401 and capable of being executed by the processor 402, the program or the instruction is executed by the processor 402 to perform each process of the method for returning of command response information in the above-mentioned embodiments, and same technical effects may be achieved. To avoid repetition, details are not further provided herein.

A readable storage medium on which a program or an instruction is stored is provided in the embodiments of the present disclosure. The program or the instruction is executed by a processor to perform each process of the embodiments of the method for returning of command response information, and same technical effects may be achieved. To avoid repetition, details are not further provided herein.

The processor is a processor in the electronic device of the foregoing embodiments. The readable storage medium includes a computer readable storage medium, such as a computer Read-Only Memory (ROM), a Random Access Memory (RAM), a magnetic disk or an optical disk.

It should be appreciated that the division of the various module in the above device is only a division based on logical functions. In actual implementation, all or some of them may be integrated into a physical entity, or they may be physically separated. These modules may all be implemented in the form of software called by a processing component; or all of them may be implemented in the form of hardware; or some modules may be implemented in the form of software called by a processing component, and some modules may be implemented in the form of hardware. For example, the receiving module may be a processing component set independently; or may be integrated in a chip of the above-mentioned device; or may be stored in the memory of the above device in the form of program code, and the functions of the receiving module is called and executed by a processing component of the above device. Other modules are implemented in a similar manner. In addition, all or part of these modules may be integrated or implemented independently. The processing component described herein may be an integrated circuit having a processing capability for signals. In the implementation process, each step of the above method or each of the above modules may be achieved by a hardware integrated logic circuit in the processor component or an instruction in a form of software.

For example, each module, unit, sub-unit or sub-module may be one or more integrated circuits configured to implement the above method, such as one or more Application Specific Integrated Circuits (ASICs), or one or more digital signal processors (DSP), or, one or more Field Programmable Gate Arrays (FPGAs), etc. For another example, when a module of the above modules is implemented in the form of program codes called by a processing component, the processing component may be a general purpose processor, such as a central processing unit (CPU) or other processors capable of calling the program codes. For another example, these modules may be integrated and implemented in the form of a system-on-a-chip (SOC).

The embodiments of the present disclosure are described above with reference to the accompanying drawings. However, the present disclosure is not limited to the foregoing specific implementations. The foregoing specific implementations are merely illustrative rather than limitative. Under the inspiration of the present disclosure, a person of ordinary skill in the art may make various forms without departing from the purposes of the present disclosure and the scope of the claims, and these forms all fall within the protection scope of the present disclosure.

What is claimed is:

1. A method for returning command response information, comprising:
   receiving response information for a command request, wherein the response information carries a status identification and a level identification of the command request;
   storing the response information in a corresponding level of a data queue in accordance with the level identification, wherein the data queue comprises a plurality of levels, and each of the plurality of levels of the data queue is used to store one or more pieces of response information;
   scanning all levels of the plurality of levels of the data queue, and determining a level of the plurality of levels in which all parts of the response information are collected as a candidate level;
   determining a first piece of response information in accordance with a status identification of the response information stored in the candidate level; and
   outputting the first piece of response information.

2. The method for returning of command response information according to claim 1, wherein scanning all levels of the plurality of levels of the data queue and determining the level in which all part of response information are collected as the candidate level comprises:
   determining whether a data status flag bit about response information currently stored in each level of the data queue meets a preset condition; and
   in a case that the data status flag bit meets the preset condition, determining the level as the candidate level.

3. The method for returning of command response information according to claim 1, wherein prior to receiving the response information for the command request, the method further comprises:
   receiving the command request;
   storing the command request in a command queue, wherein the command queue comprises a plurality of levels; and
   storing the status identification and the level identification of the command request in the command queue.

4. The method for returning of command response information according to claim 3, wherein the status identification comprises a timing identification of the command request stored in the command queue, and determining the first piece of response information in accordance with the status identification of the response information stored in the candidate level comprises:
   determining a candidate command request stored in a corresponding level of the command queue, in accordance with the level identification of the response information stored in the candidate level;

determining a first command request from the candidate command request in accordance with a timing identification of the candidate command request, wherein a level identification of the first command request is a target level identification; and determining, in accordance with the target level identification, target response information stored in a target level of the data queue, as the first piece of response information.

5. The method for returning of command response information according to claim 4, wherein a plurality of command requests of a same type has a same identity, the status identification further comprises an identity of the command request stored in the command queue, subsequent to the storing the status identification and the level identification of the command request stored in the command queue, and the method further comprises:

recording whether there is a command request stored in the level of the command queue;

recording a first sequence identification of the command request, wherein the first sequence identification includes a sequence in which command requests having a same identity as the command request are stored in the command queue;

scanning all levels of the command queue, and determining whether another command request having the same identity as the command request has been stored, wherein in the case that the another command request having the same identity has not been stored, the command request is recorded as a valid command request, and in the case that another command request having the same identity has been stored, the command request is recorded as an invalid command request; and storing the identity and the first sequence identification of the command request stored in the command queue; and wherein, the determining the first command request from the candidate command request in accordance with the timing identification of the candidate command request comprises, selecting a candidate level in which a valid command request is stored; and determining the first command request from the candidate level of the command queue in which the valid command request is stored, in accordance with the timing identification of the candidate command request.

6. The method for returning of command response information according to claim 4, wherein subsequent to the outputting the first piece of response information, the method further comprises:

releasing the target level of the command queue; and updating timing identifications of all levels of the command queue.

7. The method for returning of command response information according to claim 1, wherein each command request corresponds to one piece of response information, each piece of response information comprises a plurality of pieces of response sub-information, each piece of response sub-information carries a second sequence identification, and a return sequence of at least one of the pieces of response sub-information in the response information is stored in the second sequence identification; and the outputting the first piece of response information comprises outputting the plurality of pieces of response sub-information of the first piece of response information sequentially in accordance with the second sequence identification carried in each piece of response sub-information of the first piece of response information.

8. An electronic device, comprising: a processor, a memory and a program or an instruction stored in the memory and executable by the processor, wherein the program or the instruction, when being executed by the processor, performs the steps of a method for returning of command response information, the method comprising:

receiving response information for a command request, wherein the response information carries a status identification and a level identification of the command request;

storing the response information in a corresponding level of a data queue in accordance with the level identification, wherein the data queue comprises a plurality of levels, and each of the plurality of levels of the data queue is used to store one or more pieces of response information;

scanning all levels of the plurality of levels of the data queue, and determining a level of the plurality of levels in which all parts of the response information are collected as a candidate level;

determining a first piece of response information in accordance with a status identification of the response information stored in the candidate level; and outputting the first piece of response information.

9. A non-transitory readable storage medium, on which a program or an instruction is stored, wherein the program or the instruction, when being executed by a processor, performs the steps of a method for returning of command response information, and the method comprising:

receiving response information for a command request, wherein the response information carries a status identification and a level identification of the command request;

storing the response information in a corresponding level of a data queue in accordance with the level identification, wherein the data queue comprises a plurality of levels, and each of the plurality of levels of the data queue is used to store one or more pieces of response information;

scanning all levels of the plurality of levels of the data queue, and determining a level of the plurality of levels in which all parts of the response information are collected as a candidate level;

determining a first piece of response information in accordance with a status identification of the response information stored in the candidate level; and outputting the first piece of response information.

10. The electronic device according to claim 8, wherein scanning all levels of the plurality of levels of the data queue and determining the level in which all part of response information are collected as the candidate level comprises:

determining whether a data status flag bit about response information currently stored in each level of the data queue meets a preset condition; and in a case that the data status flag bit meets the preset condition, determining the level as the candidate level.

11. The electronic device according to claim 8, wherein prior to receiving the response information for the command request, the method further comprises:

receiving the command request;

storing the command request in a command queue, wherein the command queue comprises a plurality of levels; and storing the status identification and the level identification of the command request in the command queue.

12. The electronic device according to claim 11, wherein the status identification comprises a timing identification of the command request stored in the command queue, and determining the first piece of response information in accordance with the status identification of the response information stored in the candidate level comprises:
   determining a candidate command request stored in a corresponding level of the command queue, in accordance with the level identification of the response information stored in the candidate level;
   determining a first command request from the candidate command request in accordance with a timing identification of the candidate command request, wherein a level identification of the first command request is a target level identification; and
   determining, in accordance with the target level identification, target response information stored in a target level of the data queue as the first piece of response information.

13. The electronic device according to claim 12, wherein a plurality of command requests of a same type has a same identity, the status identification further comprises an identity of the command request stored in the command queue, and subsequent to the storing the status identification and the level identification of the command request stored in the command queue, the method further comprises:
   recording whether there is a command request stored in the level of the command queue;
   recording a first sequence identification of the command request, wherein the first sequence identification includes a sequence in which command requests having a same identity as the command request are stored in the command queue;
   scanning all levels of the command queue, and determining whether another command request having the same identity as the command request has been stored, wherein in the case that another command request having the same identity has not been stored, the command request is recorded as a valid command request, and in the case that another command request having the same identity has been stored, the command request is recorded as an invalid command request; and
   storing the identity and the first sequence identification of the command request stored in the command queue; and
   wherein,
   determining the first command request from the candidate command request in accordance with the timing identification of the candidate command request comprises,
   selecting a candidate level in which a valid command request is stored, and
   determining the first command request from the candidate level of the command queue in which the valid command request is stored, in accordance with the timing identification of the candidate command request.

14. The electronic device according to claim 12, wherein subsequent to the outputting the first piece of response information, the method further comprises:
   releasing the target level of the command queue; and
   updating timing identifications of all levels of the command queue.

15. The electronic device according to claim 8, wherein each command request corresponds to one piece of response information, each piece of response information comprises a plurality of pieces of response sub-information, each piece of response sub-information carries a second sequence identification, and a return sequence of at least one of the pieces of response sub-information in the response information is stored in the second sequence identification; and
   the outputting the first piece of response information comprises outputting the plurality of pieces of response sub-information of the first piece of response information sequentially in accordance with the second sequence identification carried in each piece of response sub-information of the first piece of response information.

16. The non-transitory readable storage medium according to claim 9, wherein scanning all levels of the plurality of levels of the data queue and determining the level in which all part of response information are collected as the candidate level comprises:
   determining whether a data status flag bit about response information currently stored in each level of the data queue meets a preset condition; and
   in a case that the data status flag bit meets the preset condition, determining the level as the candidate level.

17. The non-transitory readable storage medium according to claim 9, wherein prior to receiving the response information for the command request, the method further comprises:
   receiving the command request;
   storing the command request in a command queue, wherein the command queue comprises a plurality of levels; and
   storing the status identification and the level identification of the command request in the command queue.

18. The non-transitory readable storage medium according to claim 17, wherein the status identification comprises a timing identification of the command request stored in the command queue, and determining the first piece of response information in accordance with the status identification of the response information stored in the candidate level comprises:
   determining a candidate command request stored in a corresponding level of the command queue, in accordance with the level identification of the response information stored in the candidate level;
   determining a first command request from the candidate command request in accordance with a timing identification of the candidate command request, wherein a level identification of the first command request is a target level identification; and
   determining, in accordance with the target level identification, target response information stored in a target level of the data queue as the first piece of response information.

19. The non-transitory readable storage medium according to claim 18, wherein a plurality of command requests of a same type has a same identity, the status identification further comprises an identity of the command request stored in the command queue, and subsequent to the storing the status identification and the level identification of the command request stored in the command queue, the method further comprises:
   recording whether there is a command request stored in the level of the command queue;
   recording a first sequence identification of the command request, wherein the first sequence identification includes a sequence in which command requests having a same identity as the command request are stored in the command queue;

scanning all levels of the command queue, and determining whether another command request having the same identity as the command request has been stored, wherein in the case that another command request having the same identity has not been stored, the command request is recorded as a valid command request, and in the case that another command request having the same identity has been stored, the command request is recorded as an invalid command request; and storing the identity and the first sequence identification of the command request stored in the command queue; and wherein, determining the first command request from the candidate command request in accordance with the timing identification of the candidate command request comprises, selecting a candidate level in which a valid command request is stored, and determining the first command request from the candidate level of the command queue in which the valid command request is stored, in accordance with the timing identification of the candidate command request.

20. The non-transitory readable storage medium according to claim 18, wherein subsequent to the outputting the first piece of response information, the method further comprises:

releasing the target level of the command queue; and updating timing identifications of all levels of the command queue.

* * * * *